July 11, 1961 J. W. THOMAS 2,992,402
THERMOCOUPLE LEAD ATTACHMENT
Filed Aug. 15, 1958
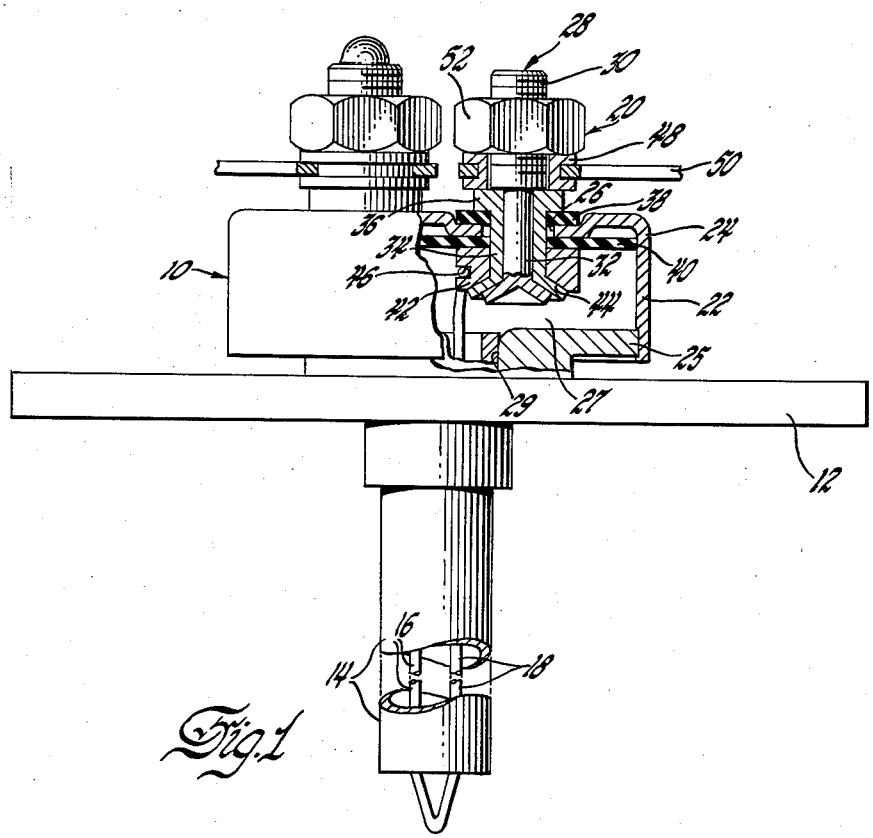
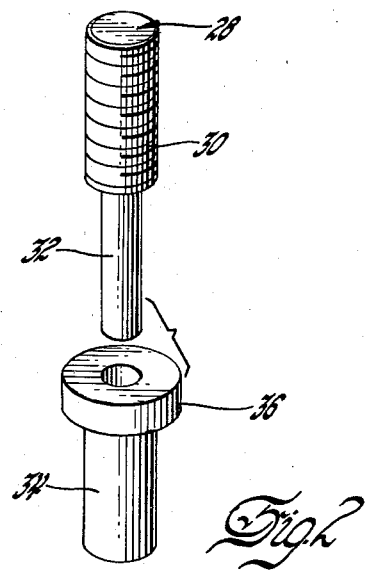
INVENTOR.
James W. Thomas
BY
R. T. Barnard
ATTORNEY

United States Patent Office 2,992,402
Patented July 11, 1961

2,992,402
THERMOCOUPLE LEAD ATTACHMENT
James W. Thomas, Indianapolis, Ind., assignor to General Motors Corporation, Detroit, Mich., a corporation of Delaware
Filed Aug. 15, 1958, Ser. No. 755,163
5 Claims. (Cl. 339—198)

The present invention relates to improved means for attaching thermocouple lead wires to thermocouple studs. The present invention results in a thermocouple assembly in which the failures or rejections due to faulty connecting mechanisms are considerably reduced.

The present invention relates to thermocouples in which alloys such as those of aluminum-nickel and chromium-nickel are used in the thermoelectric circuit including the hot leads and connector studs. Particularly when used with jet engines, it is important that thermocouples accurately and reliably reflect engine temperatures. It is for this reason that such alloys are used since previous types of thermocouple materials have been found to have varying thermo-electric properties and have accordingly not provided the requisite accuracy under high temperature operating conditions.

However, while such alloy materials have provided the required accuracy in terms of temperature measurement, they have created certain secondary problems related to mechanical strength and machinability. It has been the practice to thread the connector studs made of these alloys as part of the means for connecting the leads thereto. Such alloys are approximately 90 to 95% nickel. As a result studs made of these materials when threaded have extremely sensitive threads and any nick or blemish on the thread will produce galling with a resultant thermocouple rejection.

The present invention, therefore, provides means for connecting the thermocouple lead wires to connector studs in such a way as to avoid threading terminal components of the thermocouple circuit and thus provide a new and improved thermocouple assembly.

In addition to providing an improved thermocouple utilizing alloys of aluminum and nickel and chromium and nickel having reliable thermo-electric characteristics, the present invention also provides in combination therewith a connector mechanism utilizing a basic supporting and clamping structure of a material such as steel, having the requisite mechanical strength and machinability. Further, the present connector assembly or coupling device is constructed in such a way as to electrically isolate the current conducting portion of the connector assembly from the supporting portion thereof.

By thus combining materials having desirable thermoelectric properties with materials having suitable mechanical strengths, an improved thermocouple connector assembly is realized.

Other objects and advantages of the present invention will be apparent from a perusal of the detailed description which follows.

In the drawings:

FIGURE 1 is a partially sectioned view of a thermocouple embodying the subject invention; and FIGURE 2 is an exploded view showing certain details of the invention.

As already noted, the subject thermocouple assembly is particularly adapted for use with a jet engine where accuracy in determining engine temperatures is exceedingly important. However, it is apparent that the thermocouple may be used in any environment where such a device is desired.

The thermocouple assembly is indicated generally at 10 and includes a supporting plate member 12 to which a probe casing 14 is suitably attached. Probe casing 14 houses a pair of lead wires 16 and 18 each formed of a different alloy material and which wires are connected so as to set up an E.M.F. differential which is proportional to the temperature to which the probe casing and hence the junction of lead wires 16 and 18 are exposed.

As already suggested the lead wires 16 and 18 are preferably formed of dissimilar materials having reliable thermo-electric characteristics when subjected to high temperatures such as are encountered in a jet engine. Consistent with this purpose, lead wire 16 may be formed of an alloy of aluminum and nickel while lead 18 may be formed of an alloy of chromium and nickel. While the lead alloys suggested have the requisite thermoelectric characteristics, they have certain undesirable mechanical characteristics, supra, which make their use in connector devices somewhat difficult particularly when it is necessary or desirable to thread such members to connect lead wires thereto as has been done in the past.

Accordingly, in the present invention a thermocouple lead attachment indicated generally at 20 is provided which utilizes the desirable thermo-electric characteristics of the aforenoted alloys but which combines therewith a supporting device providing the desirable mechanical characteristics otherwise wanting with such alloys.

A cover casing 22 is provided and is suitably mounted on supporting plate 12. Cover casing 22 is of an inverted dish-shaped configuration and includes an upper wall 24 having a plurality of openings 26 therein adapted to receive the thermocouple lead attachment 20. A plate member 25 mounted upon or formed integrally with plate 12 encloses the open end of casing 22 whereby the latter and the plate define a chamber 27. Plate member 25 includes a central aperture 29 adapted to receive and support one end of probe casing 14.

Inasmuch as the lead attachments 20 are identical only one has been shown in cross sectional detail. Attachment 20 includes a stud member 28 preferably formed of steel and including a threaded portion 30 and a portion of reduced cross section 32. A sleeve 34 formed of one of the suggested thermo-electric alloys such as aluminum and nickel, corresponding to the material of the attached lead 18, infra, is provided and is adapted to fit over the reduced shank portion 32 of stud 28 as indicated in FIGURE 2. Sleeve 34 includes a flange 36.

The subassembly of stud 28 and sleeve 34 is adapted to be inserted through one of the holes or openings 26 in wall 24 of cover casing 22. A washer member 38 of any suitable material, such as mica, is disposed intermediate sleeve flange 36 and casing wall 24 in order to electrically insulate the sleeve from the casing material. A similar insulating washer 40 is provided on the opposite side of casing wall 24 for the same purpose.

A bushing 42, of the same material as sleeve 34 and lead 18, is snugly mounted on the sleeve to make electrical contact therewith. In order to facilitate securing bushing 42 upon the sleeve 34 and also to secure the subassembly of stud 28, sleeve 34 and bushing 42 to the cover casing 22, the bushing is provided with a conically shaped counterbore 44. Stud shank 32 and the associated end of sleeve 34 may be stamped or otherwise deformed into engagement with counterbore 44 to secure the subassembly together.

Bushing 42 is provided with a peripheral slot 46 adapted to receive one end of hot lead 18. If desired, bushing 42 may be suitably crimped or otherwise deformed and welded adjacent lead 18 to insure a proper mechanical and electrical connection between the lead and the bushing.

A washer-like lead connector member 48 is mounted over threaded portion 30 of stud 28 and supported upon flange 36 of sleeve 34. Member 48 is connected in any suitable manner, as by soldering, to a lead wire 50 which in turn connects with any suitable measuring instrument, not shown. Lead 50 and member 48 are likewise formed of the same material as sleeve 34 and lead 18. Member 48 is secured in position on stud 28 and sleeve 34 by a nut member 52. Stud 28 and nut 52 may be formed of steel which permits the nut to be tightly drawn up on the stud to insure a good electrical contact between member 48 and sleeve 34 without fear of shearing or otherwise damaging the stud as might otherwise occur if the latter were formed of the same material as the sleeve.

It is apparent that various structural modifications of the subject thermocouple lead attachment may be made within the scope of the above teaching.

I claim:

1. A thermocouple assembly comprising a probe casing, a pair of lead wires disposed in said probe casing, a cover casing suitably connected to said probe casing such that one end of each lead extends within said cover casing, and a plurality of lead attachment devices mounted upon and including a portion thereof extending within said cover casing, said attachment devices each comprising a stud having threaded and unthreaded shank portions, a sleeve surrounding the unthreaded portion of said stud, said stud and sleeve being supported upon said cover casing and including portions extending therewithin, means for electrically insulating said sleeve and stud from said cover casing, a bushing mounted on said sleeve within said casing and also electrically insulated from the latter, means for holding said stud, sleeve and bushing on said cover casing, each of said lead wires being connected at one end to the bushing member of each attachment device, a lead connector mounted on said stud and supported upon said sleeve in electrical contact therewith, and a nut adapted to be mounted on the threaded shank of said stud means to clampingly engage said connector to said sleeve.

2. A thermocouple assembly comprising a probe casing, a pair of lead wires disposed in said probe casing, a cover casing suitably connected to said probe casing such that one end of each lead extends within said cover casing, said cover casing including a plurality of apertures formed therethrough, and a plurality of lead attachment devices mounted upon the cover casing and including a portion thereof extending through said apertures, said attachment devices each comprising a stud having threaded and unthreaded shank portions, a sleeve surrounding the unthreaded portion of said stud, said stud and sleeve being supported upon said cover casing and including portions extending therewithin, means for electrically insulating said sleeve and stud from said cover casing, a bushing mounted on said sleeve within said casing and also electrically insulated from the latter, means for holding said stud, sleeve and bushing in assembled relation on said cover casing, each of said lead wires being connected at one end to the bushing of each attachment device, a lead connector mounted on said stud and supported upon said sleeve in electrical contact with the latter, and a nut adapted to be mounted on the threaded shank of said stud means to clampingly engage said connector to said sleeve.

3. A thermocouple assembly comprising probe and cover casings conjointly defining a hollow chamber, a plurality of electrically connected lead wires extending within said probe casing and terminating at one end within said chamber, and a plurality of lead attachment devices mounted upon said cover casing and extending within said hollow chamber, each of said devices comprising a stud having a threaded portion and a reduced shank portion, a sleeve mounted on said reduced shank portion, said sleeve including a flange at one end thereof adapted to support said sleeve and stud upon said cover casing, an electrical insulating element disposed between said flange and said cover casing, said reduced shank portion and said sleeve extending within said hollow chamber, a bushing mounted on said sleeve within said chamber, an insulating element mounted on said sleeve and disposed intermediate said cover casing and said bushing, said bushing including a counterbored portion surrounding said sleeve, said reduced shank portion and said sleeve being deformed to extend within said counterbored portion to lock said stud, sleeve and bushing, to said cover casing, each of said lead ends being electrically connected to the bushing of one of said devices, a lead connector mounted on said stud and seated upon the flanged portion of said sleeve, and a nut coacting with the threaded portion of said stud to clampingly engage said connector upon the flanged edge of said sleeve.

4. A thermocouple assembly comprising probe and cover casings conjointly defining a hollow chamber, said cover casing including a plurality of apertures formed therethrough, a plurality of electrically connected lead wires extending within said probe casing and terminating at one end within said chamber, and a plurality of lead attachment devices mounted upon said cover casing and extending through said apertures, each of said devices comprising a stud having a threaded portion and a reduced shank portion, a sleeve mounted on said reduced shank portion, said sleeve including a flange at one end thereof adapted to support said sleeve and stud upon said cover casing, an electrical insulating element disposed between said flange and said cover casing, said reduced shank portion and said sleeve extending within said hollow chamber, a bushing mounted on said sleeve within said chamber, an insulating element mounted on said sleeve and disposed intermediate said cover casing and said bushing, said bushing including a counterbored portion surrounding said sleeve, said reduced shank portion and said sleeve being deformed to extend within said counterbored portion to lock said stud, sleeve and bushing, to said cover casing, each of said lead ends being electrically connected to the bushing of one of said devices, a lead connector mounted on said stud and seated upon the flanged portion of said sleeve, and a nut coacting with the threaded portion of said stud to clampingly engage said connector upon the flanged edge of said sleeve.

5. A thermocouple assembly as set forth in claim 2 in which said cover casing comprises an inverted dish-shaped member, and a centrally apertured plate adapted to enclose the open end of the cover casing and to centrally support the probe casing within the cup aperture.

References Cited in the file of this patent

UNITED STATES PATENTS

| 1,869,151 | Jeffery et al. | July 26, 1932 |
| 2,225,801 | Schnoll | Dec. 24, 1940 |
| 2,503,459 | Thornbery | Apr. 11, 1950 |
| 2,547,866 | Hingelberg | Apr. 3, 1951 |
| 2,812,381 | May | Nov. 5, 1957 |

FOREIGN PATENTS

| 179,547 | Great Britain | Apr. 5, 1923 |